(12) United States Patent
Tsai (10) Patent No.: US 7,565,180 B2
(45) Date of Patent: Jul. 21, 2009

(54) DIAL SYSTEM FOR A STEERING WHEEL OF AN AUTOMOBILE

(75) Inventor: Huo-Lu Tsai, Taichung Hsien (TW)

(73) Assignee: SUNREX Technology Corp. (TW)

( * ) Notice: Subject to any disclaimer, the term of this patent is extended or adjusted under 35 U.S.C. 154(b) by 535 days.

(21) Appl. No.: 11/247,072

(22) Filed: Oct. 11, 2005

(65) Prior Publication Data

US 2007/0082713 A1    Apr. 12, 2007

(51) Int. Cl.
  *H04B 1/38* (2006.01)
  *H04M 1/00* (2006.01)
(52) U.S. Cl. .................. 455/569.2; 455/88; 455/90; 455/345
(58) Field of Classification Search .............. 455/569.2, 455/88, 90, 345, 550.1, 556.1
See application file for complete search history.

(56) References Cited

U.S. PATENT DOCUMENTS 6,209,767 B1 * 4/2001 Liou .......................... 224/276
6,532,374 B1 * 3/2003 Chennakeshu et al. ... 455/569.1
2002/0068605 A1 * 6/2002 Stanley ....................... 455/556

* cited by examiner

*Primary Examiner*—Nay A Maung
*Assistant Examiner*—Tuan H Nguyen
(74) *Attorney, Agent, or Firm*—Connolly, Bove Lodge & Hutz (57) ABSTRACT

A dial system for steering wheel of an automobile is divided into two portions electrically connected by a cable and each includes a first casing and a dial set received in the first housing. The dial set includes a number button partially extending the first housing for being operated. A circuit board is received in the first housing for wirelessly transmitting signals when the buttons are operated. A second housing is mounted to the first housing to form a space for receiving the dial set and the circuit board. A battery seat with battery is laterally inserted into the space for providing power to the circuit board. A clamp is mounted to a bottom of the second housing and clamps the steering wheel to hold the dial system in place on the steering wheel for an easy operation.

2 Claims, 9 Drawing Sheets

DIAL SYSTEM FOR A STEERING WHEEL OF AN AUTOMOBILE

BACKGROUND OF THE INVENTION

1. Field of the Invention

The present invention relates to dial system, and more particularly to a dial system for a steering wheel of an automobile co-operating with a mobile phone that has a bluetooth module.

2. Description of Related Art

A conventional mobile phone with a hand-free receiver in accordance with the prior is mounted in an automobile so that the driver in the automobile can perform the dialogue function during driving operating the steering wheel of the automobile without having to hold the mobile phone during driving.

However, the driver still to press the press buttons on the mobile phone for performing a dial function whereby the driver's hand has to leave the steering wheel so as to press the press buttons while the driver has to turn around his head to watch the numbers on the press buttons for dialing the correct telephone numbers so that the driver's view of sight will deviate the direction of travel of the automobile, thereby easily causing danger to the driver during driving.

There are many inventions are provided to overcome the above problem, such as the U.S. Pat. No. 6,339,700 and U.S. Pat. No. 6,567,676. However, the two patents contain some disadvantages that need to be advantageously altered. As to the U.S. Pat. No. 6,339,700, the buttons are mounted on the steering wheel and equally divided the steering wheel into several sections. Consequently, the buttons are separated from one another. It is hard to dial a complete telephone number and the driver may unwillingly press the buttons during turning the steering wheel. As to the U.S. Pat. No. 6,567,676, the dial communication devices respectively clamp the steering wheel so that the connection between the dial communication devices and the steering wheel is unstable. In addition, the U.S. Pat. No. 6,567,676 transmits the signal from the two dial communication devices to the mainframe by wires that may be entwined when the driver turns the steering wheel.

The present invention has arisen to mitigate and/or obviate the disadvantages of the conventional dial device that is mounted on the steering wheel of an automobile.

SUMMARY OF THE INVENTION

The main objective of the present invention is to provide an improved dial system for steering wheel of an automobile co-operating with a mobile phone for promoting the safety when dialing telephone number during driving.

To achieve the objective, the dial system in accordance with the present invention is divided into two portions electrically connected by a cable and each includes a first casing and a dial set received in the first housing. The dial set includes a number button and multiple functional buttons partially extending the first housing for being operated. A circuit board is received in the first housing for wirelessly transmitting signals when the buttons are operated. A second housing is mounted to the first housing to form a space for receiving the dial set and the circuit board. A battery seat with battery is laterally inserted into the space for providing power to the circuit board. A clamp is mounted to a bottom of the second housing and clamps the steering wheel to hold the dial system in place on the steering wheel for an easy operation.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-6, a dial system for a steering wheel of an automobile in accordance with the present invention is divided into a main dial (1) and a secondary dial (1'), wherein the secondary dial (1') uses a transmission interface (a cable type or a wireless type) for transmitting signal to the mail dial (1) and the mail dial (1) wirelessly transmits signal to a mobile phone (100) that has a bluetooth module. The structure of the secondary dial (1') is very similar to that of the main dial (1) such that main dial (1) is firstly described. The main dial (1) of the present invention comprises a first housing (10), a dial set (20) received in the first housing (10), a circuit board (30) mounted in the first housing (10) and a second housing (40) attached to the first housing (10) for containing the dial set (20) and the circuit board (30) with the first housing (10). A battery seat (50) with a battery (51) is laterally inserted into the second housing (40) for providing power to the dial system of the present invention. A clamp (60) is mounted to a bottom of the second housing (40) and clamps the steering wheel (70) for positioning the main dial (1) on the steering wheel (70).

Figure 2:
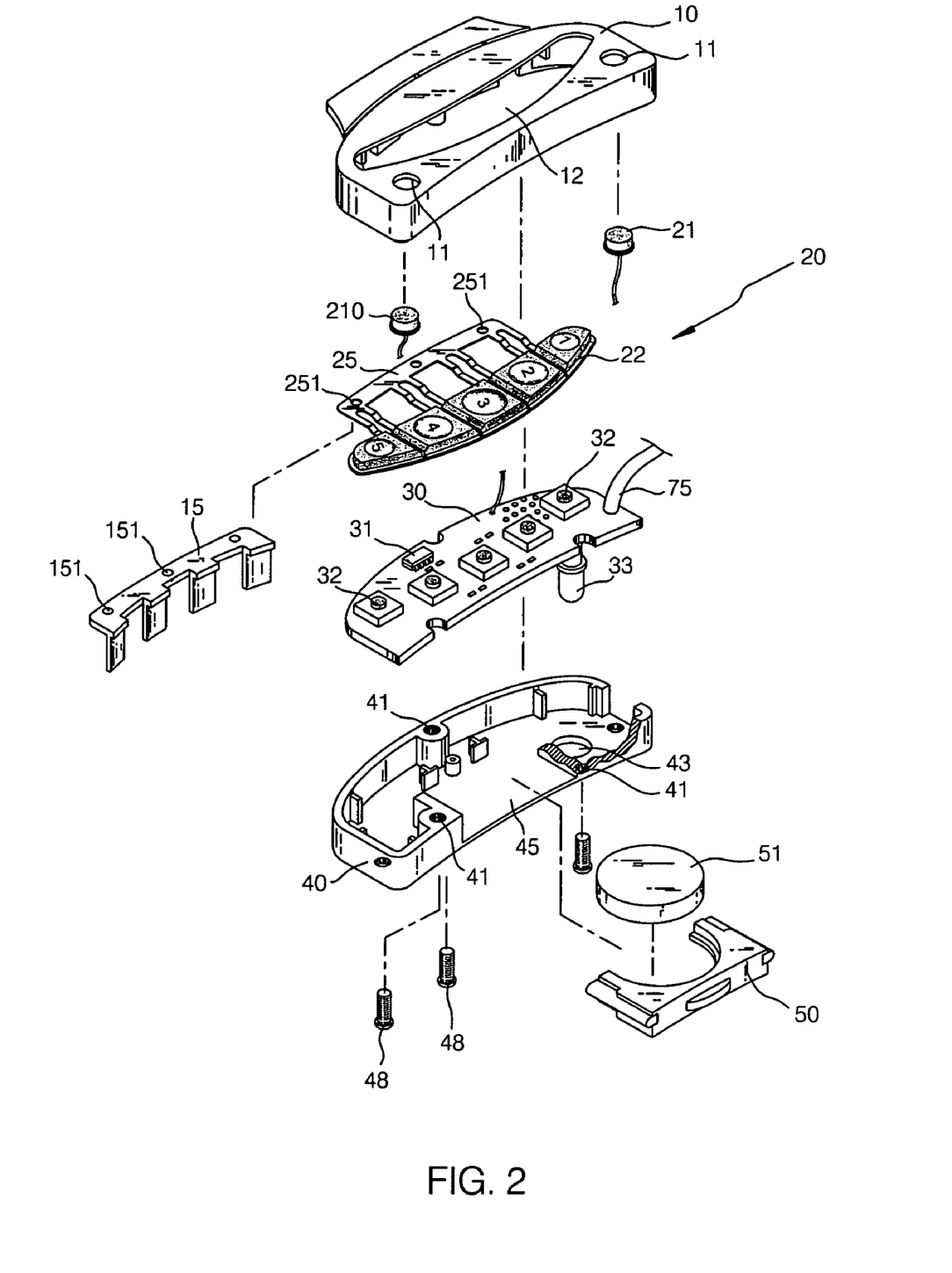
FIG. 2 is an exploded perspective view of a main dial of the dial system in FIG. 1.

The first casing (10) is longitudinal and slightly curved. A longitudinal opening (12) is defined in a top of the first housing (10), and two openings (11) are defined in the top of the first housing (10) and corresponding to two opposite ends of the longitudinal opening (12). The first housing (10) includes multiple stubs (13) downwardly extending therefrom. A speaker (21) and a microphone (210) are respectively mounted in a corresponding one of the two openings (11). The speaker (21) and the microphone (210) are electrically connected to the circuit board (30).

The dial set (20) includes a longitudinal number button (22) mounted on a metal plate (25) and received in the longitudinal opening (12). The metal plate (25) has multiple bores (251) defined in one side thereof opposite to the number button (22) to allow the multiple stubs (13) extending through the metal plate (25). A stopper (15) is mounted to the first casing (10) to hold the metal plate (25) in place. The stopper (15) has multiple bores (151) each defined to stably receive the stubs (13) for holding the metal plate (25) in place.

The circuit board (30) includes multiple button switches (32) electrically mounted thereon. Each button switch (32) aligns with a corresponding one of the longitudinal number button (22). The button switches (32) are operated when the corresponding number button (22) is pressed. A bluetooth chip (31) is electrically disposed on the circuit board (30) and a bluetooth transmitter (33) is electrically mounted on a bottom of the circuit board (30) for wirelessly transmitting signals to the mobile phone (100) when the button switches (32) are operated.

The second housing (40) is securely mounted to the first housing (10) to form a space (not numbered) for receiving the dial set (20) and the circuit board (30). The second housing (40) includes multiple threaded hole (41) defined therein and extending therethrough. Multiple screws (48) are screwed through the threaded holes (41) and extend into the first housing (10) to combine the first housing (10) and second housing (40). A hole (43) is defined in a bottom of the second housing (40) to allow the bluetooth transmitter (33) extending through the second housing (40). A lateral opening (45) is defined in the second housing (40) to allow the battery seat (50) inserted into the space between the first housing (10) and the second housing (40) to provide power to the circuit board (30).

A battery (51) is received in the battery seat (50) and electrically connected to a connector (34) that extends from the bottom of the circuit board (30) when the battery seat (50) inserted into the space between the first housing (10) and the second housing (40).

Figure 4:
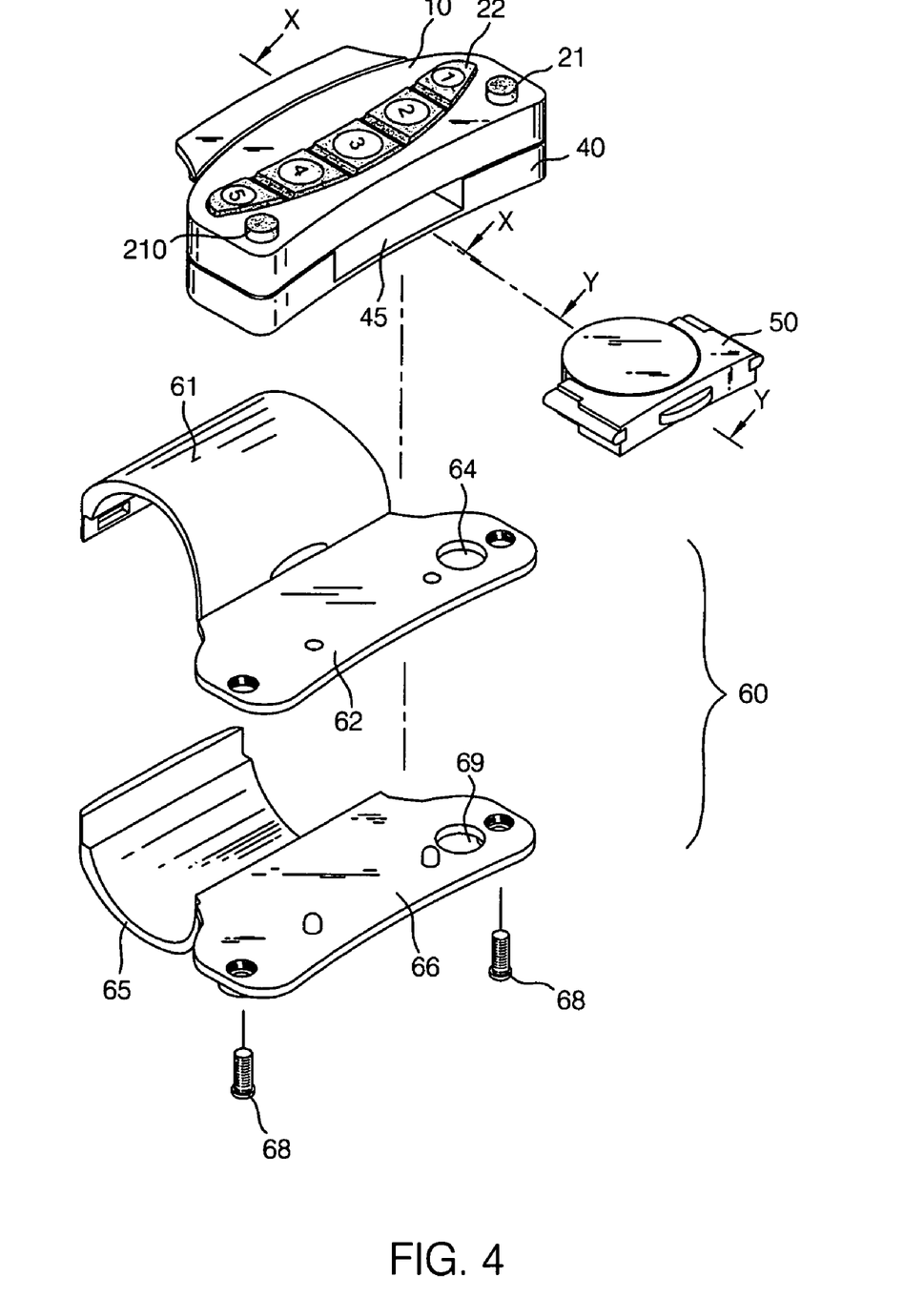
FIG. 4 is an exploded perspective view of a clamp and the main dial of the present invention.
Figure 5A:
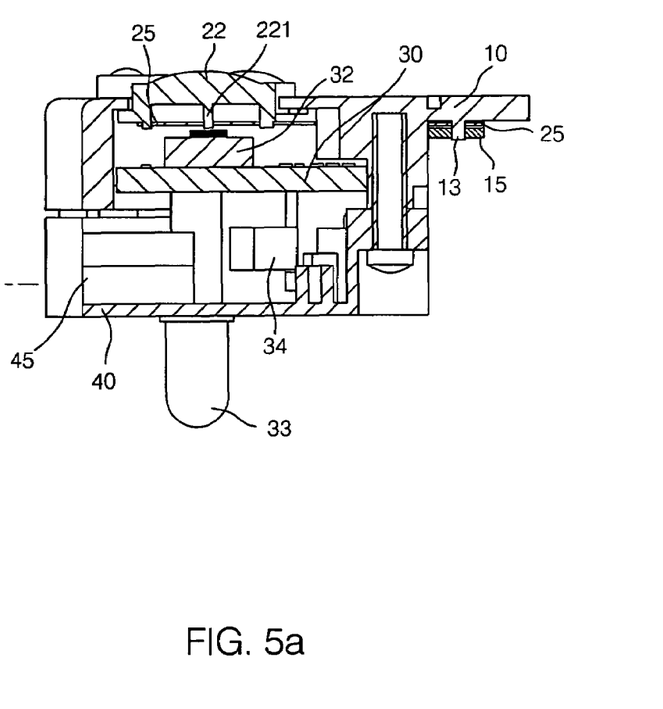
FIG. 5a is a cross-sectional view of the main dial along line X-X in FIG. 4.
Figure 5B:
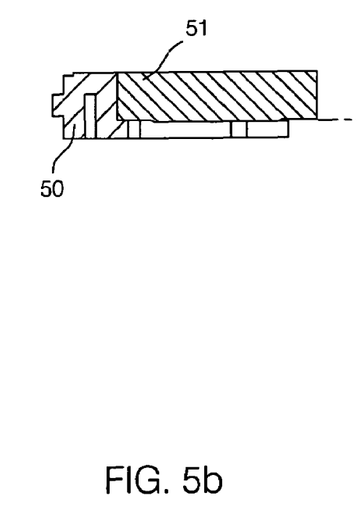
FIG. 5b is a cross-sectional view of the main dial along line Y-Y in FIG. 4.
Figure 6:
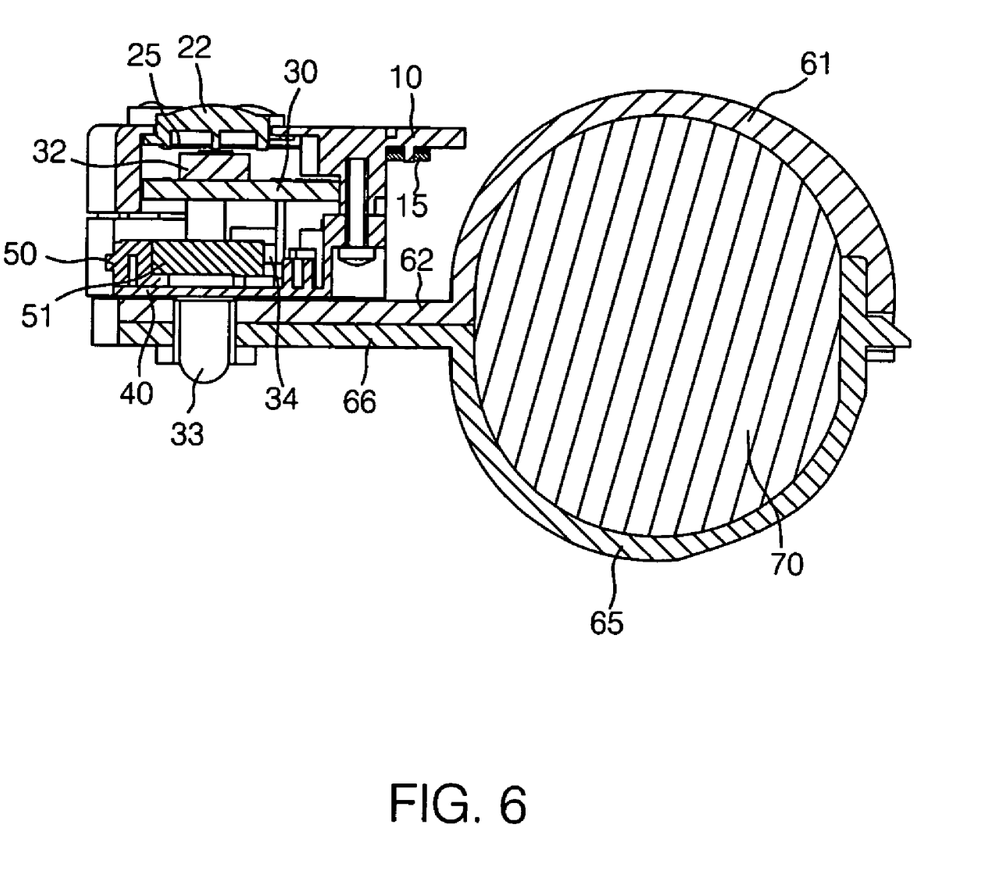
FIG. 6 is a cross-sectional view of the main dial along line Z-Z in FIG. 1.

The clamp (60) includes a curved first portion (61) and a curved second portion (65) each having a fixing plate (62, 66) laterally extending from one side thereof and abutting each other and corresponding to the shape of the steering wheel (70). The fixing plates (62, 66) each has a hole (64, 69) defined therein and aligning with each other. The wireless transmitter (33) extends through the holes (64, 69) in the clamp (60) after the present invention being assembled. The clamp (60) is secured on a bottom of the second housing (40) by bolts (68).

Figure 3:
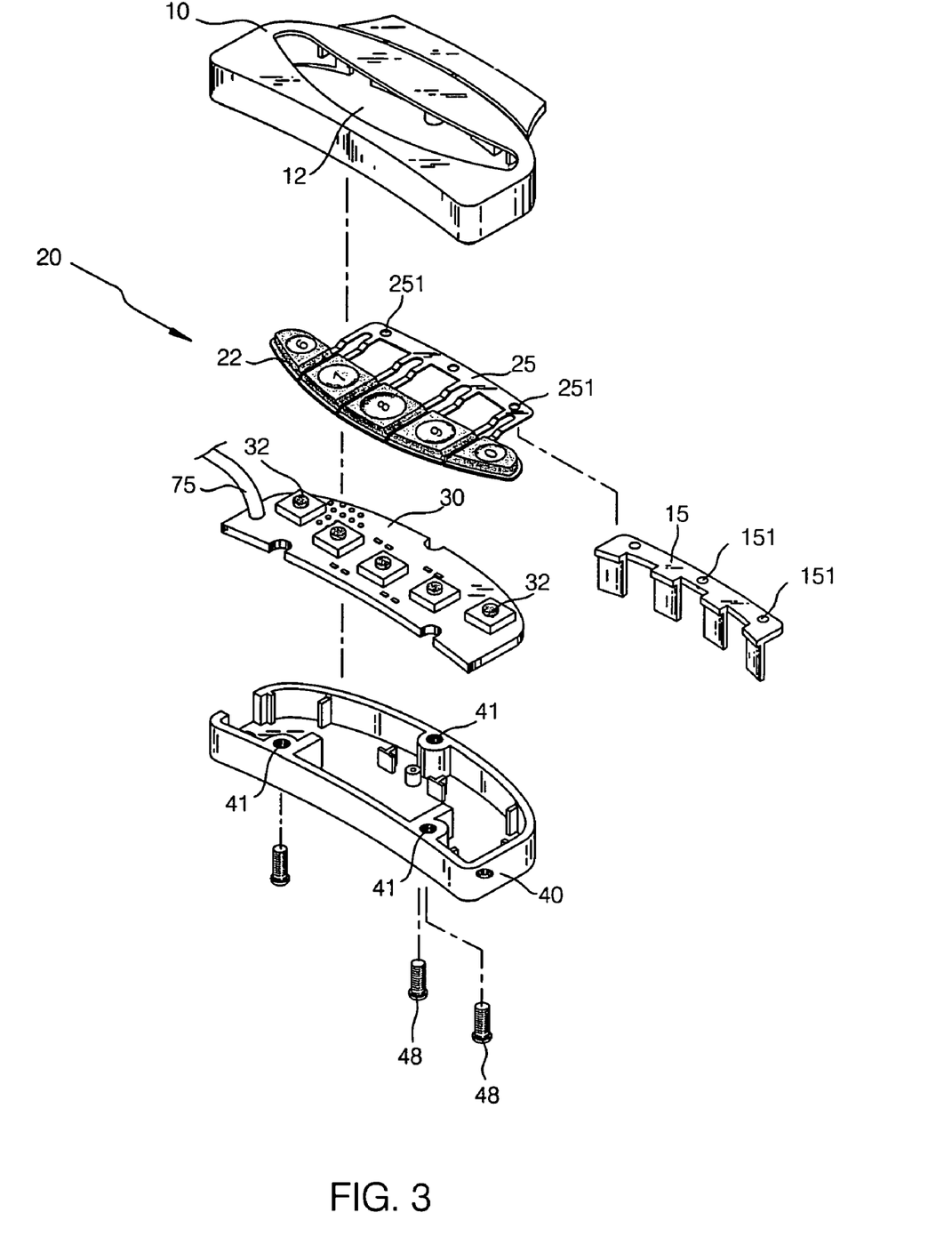
FIG. 3 is an exploded perspective view of a secondary dial of the dial system in FIG. 1.

The structure of the secondary dial (1') is similar to that of the main dial (1) and connected to the main dial (1) by a cable (75) and shares the power from the main dial (1) such that the battery seat (50), the battery (51) and the bluetooth transmitter (33) are unnecessary to the secondary dial (1').

Figure 7:
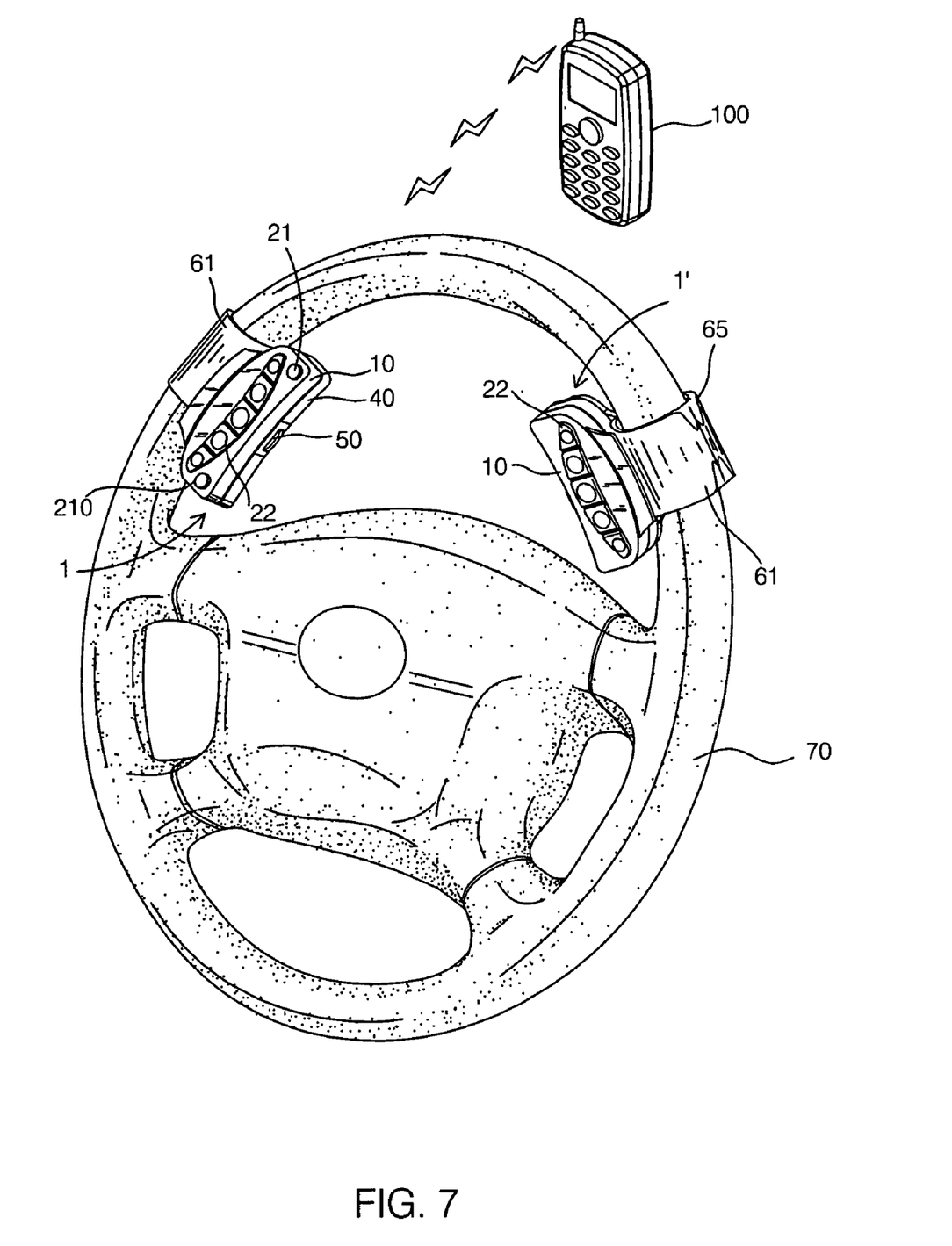
FIG. 7 is a perspective schematic view of a second embodiment of the dial system of the present invention.
Figure 8:
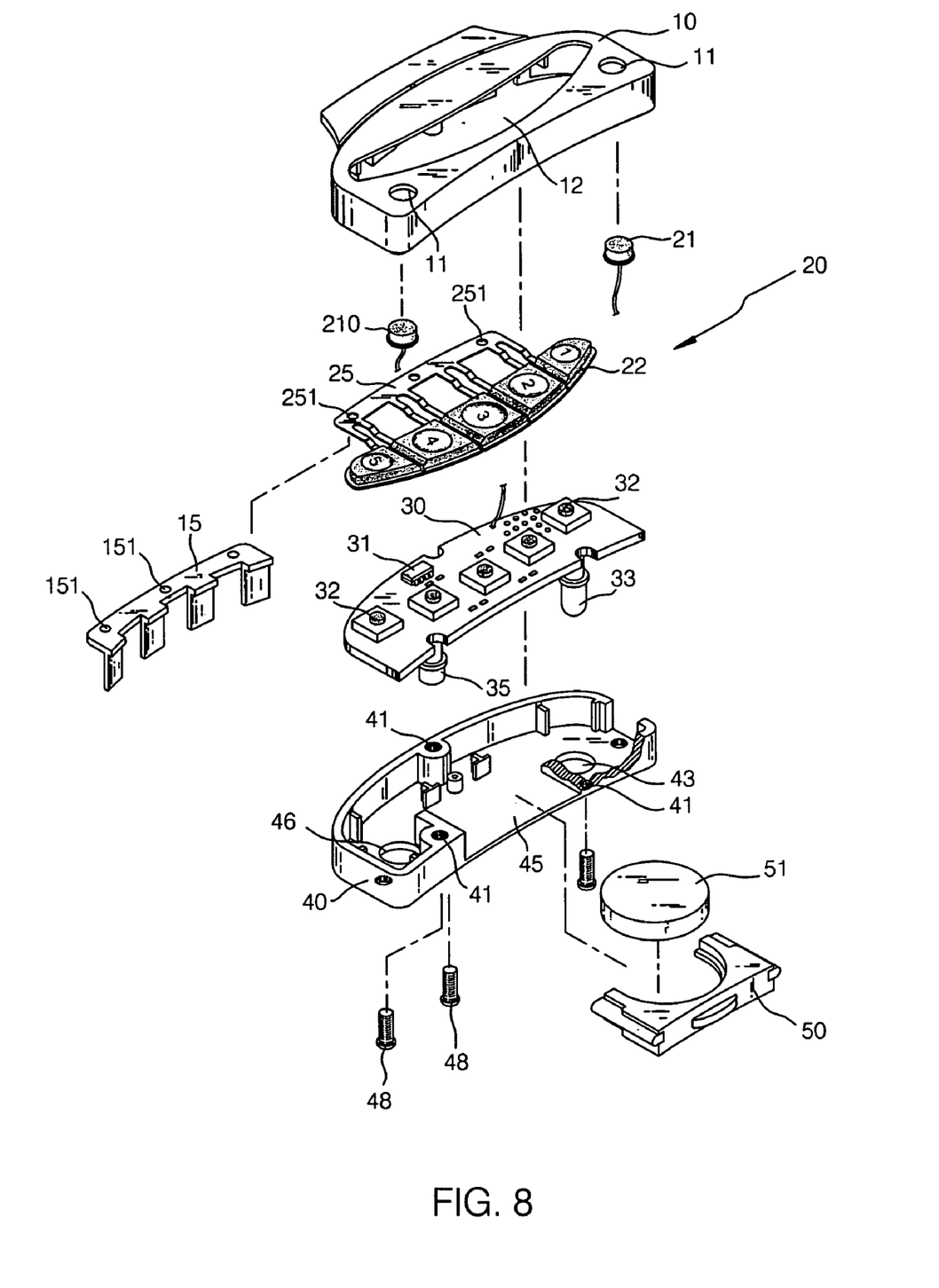
FIG. 8 is an exploded perspective view of a main dial of the dial system in FIG. 7.
Figure 9:
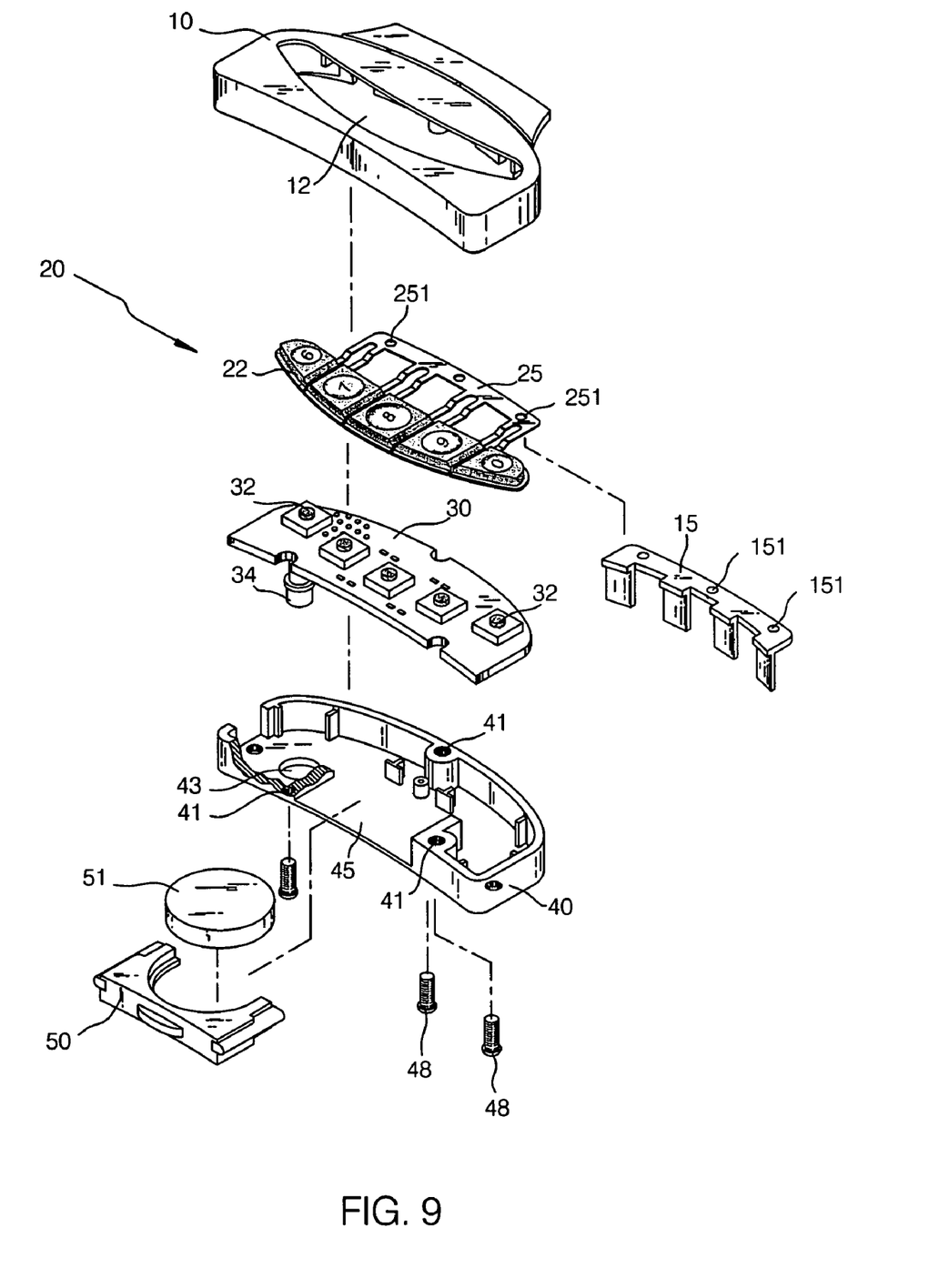
FIG. 9 is an exploded perspective view of a secondary dial of the dial system in FIG. 7.

With reference to FIGS. 7-9 that show a second embodiment of the present invention, the transmission interface between the main dial (1) and the secondary dial (1') is wireless. Consequently, the circuit board (30) of the secondary dial (1') includes a wireless transmitter (34) for transmitting signal to the main dial (1) that has a receiver (35) electrically mounted on the circuit board (30) of the main dial (1) for receiving the signal from the secondary dial (1'). In addition, a battery seat (50) with a battery (51) is laterally inserted into the secondary dial (1') for providing power to the circuit board (30) of the secondary dial (1').

Figure 1:
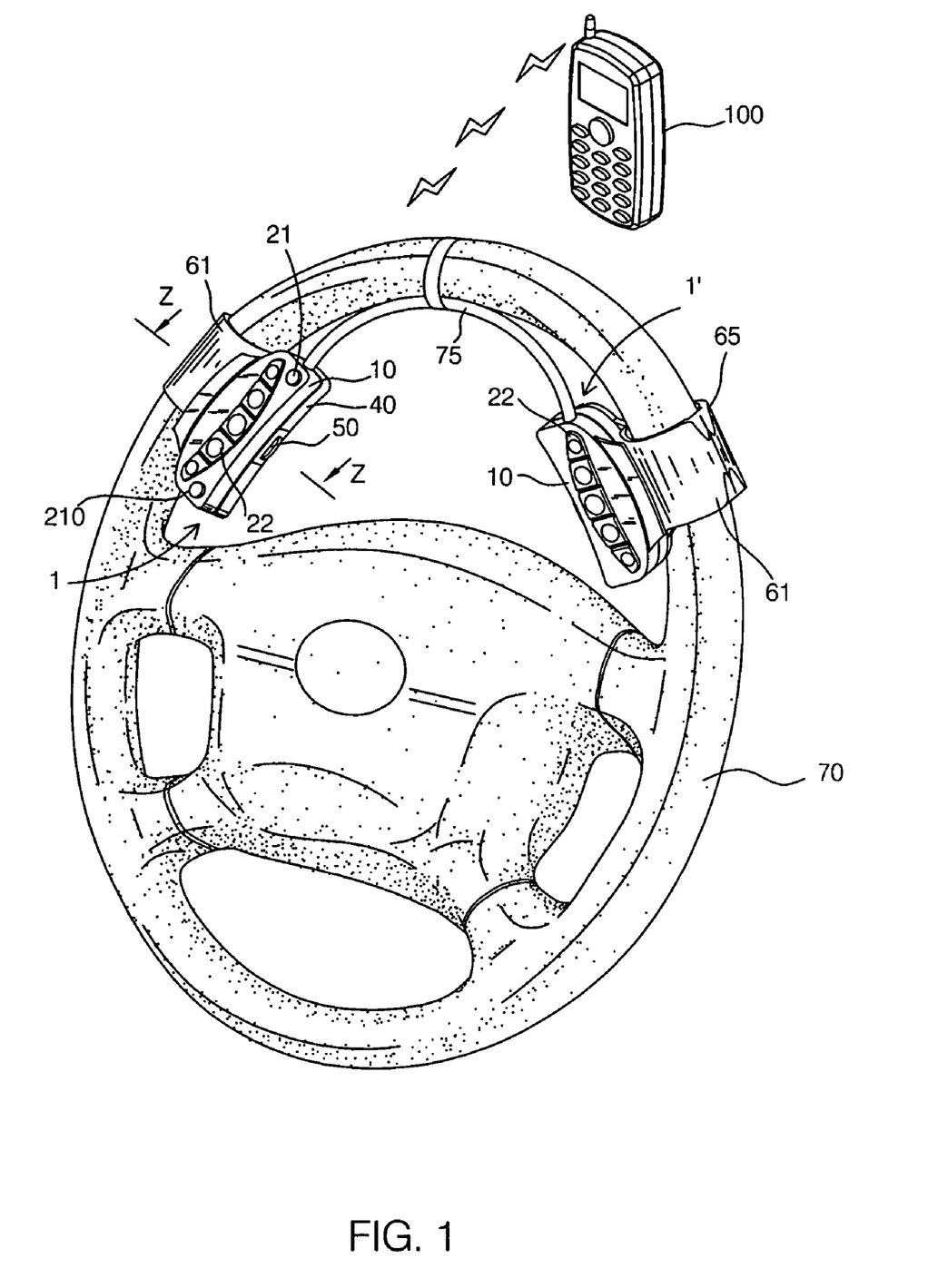
FIG. 1 is a perspective schematic view of a dial system for a steering wheel of an automobile.

As described above, the present invention is divided into a main dial (1) and a secondary dial (1') respectively mounted on the steering wheel (70) and using a transmission interface (a cable type or a wireless type) for transmitting signal. Consequently, the driver can easily dial telephone number with his/her thumbs without turning head for promoting the safety of drive. In addition, the separated design of the present invention corresponds to the ergonomics such that the driver can easily dial buttons (22) when holding the steering wheel (70). Furthermore, the driver can use the speaker (21) and the microphone (210) during speaking without taking the mobile phone.

Although the invention has been explained in relation to its preferred embodiment, it is to be understood that many other possible modifications and variations can be made without departing from the spirit and scope of the invention as hereinafter claimed.

What is claimed is:

1. A dial system for steering wheel of an automobile, comprising:
    a main dial; and
    a secondary dial electrically connected to the main dial by a cable, wherein
    the main dial comprises:
    a first housing including a longitudinal opening and a plurality of openings defined therein;
    a dial set received in the first housing and including a metal plate mounted to the first housing, a plurality of number buttons secured on the metal plate and received in the longitudinal opening in the first housing;
    a circuit board received in the first housing, the circuit board including a plurality of button switches electrically mounted thereon, each button switch aligning with a corresponding one of the number buttons such that the button switches are operated when the corresponding number button is pressed, a bluetooth chip electrically disposed on the circuit board, and a bluetooth transmitter electrically mounted on a bottom of the circuit board for wirelessly transmitting signals to a mobile phone when the button switches are operated;
    a second housing mounted to the first housing to form a space for receiving the dial set and the circuit board;
    a battery seat with a battery laterally inserted into the space between the first housing and the second housing, the battery electrically connected to the circuit board for providing power to the circuit board when the battery seat inserted into the space between the first housing and the second housing; and
    a clamp mounted to a bottom of the second housing and adapted to clamp the steering wheel to hold the dial system in place on the steering wheel for an easy operation;
    the secondary dial comprises:
    a first housing including a longitudinal opening and a plurality of openings defined therein;
    a dial set received in the first housing and including a metal plate mounted to the first housing, a plurality of number buttons secured on the metal plate and received in the longitudinal opening in the first housing;
    a circuit board received in the first housing, the circuit board including a plurality of button switches electrically mounted thereon, each button switch aligning with a corresponding one of the number buttons such that the button switches are operated when the corresponding number button is pressed;
    a second housing mounted to the first housing to form a space for receiving the dial set and the circuit board; and
    a clamp mounted to a bottom of the second housing and adapted to clamp the steering wheel to hold the dial system in place on the steering wheel for an easy operation;
    at least one of the main dial and the secondary dial includes a microphone and a speaker electrically mounted on the circuit board thereof;
    the first housing comprises a plurality of stubs extending therefrom through the metal plate, and a stopper having a plurality of stubs defined to securely receive the stubs after extending through the metal plate to hold the metal plate in place;

the bluetooth transmitter transmits the signal, which is received from the microphone, to the mobile phone; and the clamp includes a curved first portion and a curved second portion each having a fixing plate laterally extending from one side thereof and abutting each other and corresponding to the shape of the steering wheel, each fixing plate having a hole defined therein and aligning with each other, the bluetooth transmitter extending through the hole in each of the fixing plates after the dial system being assembled.

2. A dial system for steering wheel of an automobile, comprising:

a main dial; and a secondary dial electrically connected to the main dial by a wireless transmission interface, wherein the main dial comprises:

a first housing including a longitudinal opening and a plurality of openings defined therein;

a dial set received in the first housing and including a metal plate mounted to the first housing, a plurality of number buttons secured on the metal plate and received in the longitudinal opening in the first housing;

a circuit board received in the first housing, the circuit board including a plurality of button switches electrically mounted thereon, each button switch aligning with a corresponding one of the number buttons such that the button switches are operated when the corresponding number button is pressed, a receiver electrically mounted on the circuit board of the main dial for receiving the signal from the secondary dial, a bluetooth chip electrically disposed on the circuit board, and a bluetooth transmitter electrically mounted on a bottom of the circuit board for wirelessly transmitting signals to a mobile phone when the button switches are operated;

a second housing mounted to the first housing to form a space for receiving the dial set and the circuit board;

a battery seat with a battery laterally inserted into the space between the first housing and the second housing, the battery electrically connected to the circuit board for providing power to the circuit board when the battery seat inserted into the space between the first housing and the second housing; and a clamp mounted to a bottom of the second housing and adapted to clamp the steering wheel to hold the dial system in place on the steering wheel for an easy operation;

the secondary dial comprises:

a first housing including a longitudinal opening and a plurality of openings defined therein;

a dial set received in the first housing and including a metal plate mounted to the first housing, a plurality of number buttons secured on the metal plate and received in the longitudinal opening in the first housing;

a circuit board received in the first housing, the circuit board including a plurality of button switches electrically mounted thereon, each button switch aligning with a corresponding one of the number buttons such that the button switches are operated when the corresponding number button is pressed, the circuit board of the secondary dial including a wireless transmitter for transmitting signal to the main dial;

a second housing mounted to the first housing to form a space for receiving the dial set and the circuit board;

a battery seat with a battery laterally inserted into the space between the first housing and the second housing, the battery electrically connected to the circuit board for providing power to the circuit board when the battery seat inserted into the space between the first housing and the second housing; and a clamp mounted to a bottom of the second housing and adapted to clamp the steering wheel to hold the dial system in place on the steering wheel for an easy operation;

at least one of the main dial and the secondary dial includes a microphone and a sneaker electrically mounted on the circuit board thereof;

the first housing comprises a plurality of stubs extending therefrom through the metal plate, and a stopper having a plurality of stubs defined to securely receive the stubs after extending through the metal plate to hold the metal plate in place;

the bluetooth transmitter transmits the signal, which is received from the microphone, to the mobile phone; and the clamp includes a curved first portion and a curved second portion each having a fixing plate laterally extending from one side thereof and abutting each other and corresponding to the shape of the steering wheel, each fixing plate having a hole defined therein and aligning with each other, the bluetooth transmitter extending through the hole in each of the fixing plates after the dial system being assembled.

\* \* \* \* \*